United States Patent [19]
Cox et al.
[11] 3,727,012
[45] Apr. 10, 1973

[54] CALIBRATING A CARRIER ERASE MAGNETIC TAPE ANALOG RECORDING SYSTEM

[75] Inventors: Percy T. Cox; Albert P. Richter, Jr., both of Houston, Tex.
[73] Assignee: Texaco Inc., New York, N.Y.

[22] Filed: Nov. 19, 1971
[21] Appl. No.: 200,358

Related U.S. Application Data

[63] Continuation of Ser. No. 832,903, June 13, 1969, abandoned.

[52] U.S. Cl. ....................179/100.2 K, 179/100.2 D
[51] Int. Cl. ..........................G11b 5/02, G11b 5/44
[58] Field of Search ................179/100.2 K, 100.2 D; 346/23, 44; 324/34 TA

[56] References Cited

UNITED STATES PATENTS 3,275,757 9/1966 Sasseen ..........................179/100.2

OTHER PUBLICATIONS

"An Airborne Correlator to Aid Data Reduction," Meyer, Control Engineering, Vol. 5, April 1958, Pg. 127.

*Primary Examiner*—Bernard Konick
*Assistant Examiner*—Robert S. Tupper
*Attorney*—K. E. Kavanagh et al.

[57] ABSTRACT

Herein disclosed is a system for increasing the temperature range of magnetic tape analog recording systems by periodically interrupting analog signals being recorded and introducing fixed calibration current levels proportional to the analog voltage across the recording head.

2 Claims, 5 Drawing Figures

CALIBRATING A CARRIER ERASE MAGNETIC TAPE ANALOG RECORDING SYSTEM

This is a continuation of application Ser. No. 832,903, filed on June 13, 1969, and now abandoned.

CROSS REFERENCES TO RELATED APPLICATIONS

Although the invention's utility is not so limited it is especially useful in connection with so-called "Logging While Drilling" Applications involving high ambient temperature environments where various parameters are recorded on magnetic tape, in situ, deep in an earth borehole. One such application is disclosed in U.S. Pat. application Ser. No. 674,335, filed Oct. 10, 1967, now U.S. Pat. No. 3,466,597.

BACKGROUND OF THE INVENTION

This invention pertains in general to systems wherein analog signals are recorded on magnetic media (e.g., magnetic tape or the like) and wherein such media are situated in a changing elevated temperature environment. More particularly, the invention pertains to a method and apparatus for obtaining accurate magnetic recording of data even though the magnetic recording medium (e.g., magnetic tape) is undergoing substantial changes of its characteristics due to the changing elevated temperatures in which the magnetic recording is taking place.

In magnetic recording systems such as those used in the so-called "logging while drilling" systems, such as that hereinbefore identified, analog data are recorded on magnetic tape by use of a carrier-erase technique. This technique, which is common in the instrumentation recording field, is often used instead of a standard A.C. recording system where it is difficult to maintain a constant tape speed. For example, in environments of high shock and vibration it is difficult to maintain constant tape speed. In the carrier-erase method of recording a constant amplitude carrier signal is prerecorded on magnetic tape and then loaded into a carrier-erase recording system. D.C. signals proportional to the parameter being measured pass through the recording head as the magnetic tape with the prerecorded carrier thereon passes across the recording head. As a result, the carrier will be erased in proportion to the amplitude of the D.C. erase current, independent of the tape speed.

One factor limiting the feature of the carrier-erase technique, as well as other so-called amplitude recording techniques, is the effect of elevated temperatures on the magnetic recording tape. In repeated tests it has been found that increasing the temperature causes an increased carrier erasure. An increased carrier erasure is falsely interpreted as a signal increase. Initial efforts to solve the temperature dependent problem involve attempting to choose proper values of temperature sensitive resistors to compensate for changes in the magnetic tape erase characteristics. Such an attempt was found to be unsatisfactory for two reasons. First, the effect of temperature on magnetic tape is non-linear and, hence, difficult to compensate for with thermistors or other temperature sensitive resistors. Second, the effect of temperature on the erased carrier signal is a function of the erase current level.

SUMMARY OF THE INVENTION

One object of the present invention is to obtain accurate magnetic recording of data even though the magnetic recording medium (e.g., magnetic tape) is undergoing substantial changes in its various characteristics due to the changing elevated temperatures in which the recording is taking place.

Another object of the present invention is to extend the useful temperature range of magnetic tape analog recording systems.

Another object of the present invention is to achieve the foregoing objectives without the necessity for compensating for the changes in magnetic tape characteristics caused by the changing elevated temperatures.

Briefly, in accordance with the invention there is provided a method and apparatus for increasing the temperature range of magnetic tape analog recording systems by periodically interrupting the analog signal being recorded on magnetic tape and introducing fixed calibration current levels proportional to the analog voltage across the recording head. The periodic calibrations are placed automatically on the magnetic tape allowing the use of recorded data at temperatures up to the physical limitations of the magnetic tape.

Other objects and advantages as well as the various features of novelty which characterize the invention are pointed out with particularity in the claims annexed herewith and forming part of this specification. For a clearer understanding of the invention, its operating advantages and the specific objects obtained by its use, reference is to be had to the accompanying drawing figures and the following descriptive matter in which there is described a preferred embodiment and practice of the invention.

BRIEF DESCRIPTION OF THE DRAWINGS

FIG. 5 is a schematic drawing, partly in block diagram form, showing the switch driving circuitry.

DESCRIPTION OF THE PREFERRED EMBODIMENT

Although the invention as hereinafter described is disclosed with reference to the calibration of a carrier-erase magnetic recording system over a wide range of temperatures, it is to be understood that the inventive technique disclosed is also applicable to other techniques of amplitude recording. Moreover, no effort is made to compensate for the changes in the magnetic tape characteristics caused by the elevated temperature changes. Instead, fixed calibration current levels proportional to the analog input voltage to the recording head are passed through the recording head at appropriate intervals. During this time of calibration the analog signal is interrupted. Hence, a constant updating of the magnetic tape calibration is provided.

Figure 1:
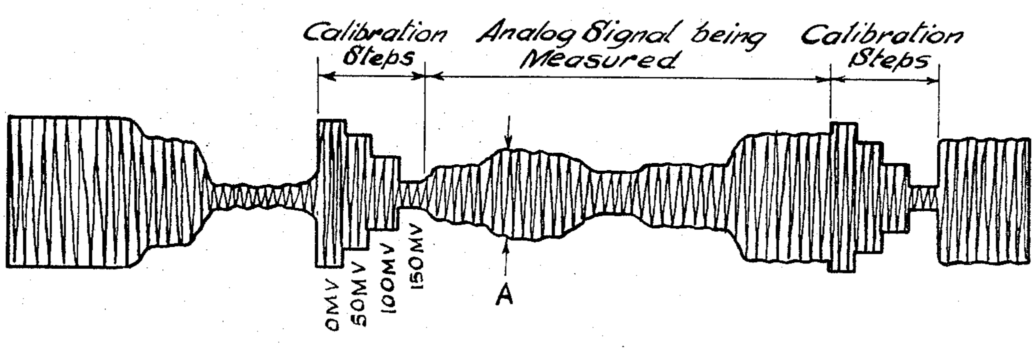
FIG. 1 is an illustration of a typical carrier-erase recording as it would appear when played back onto light sensitive paper.
Figure 2:
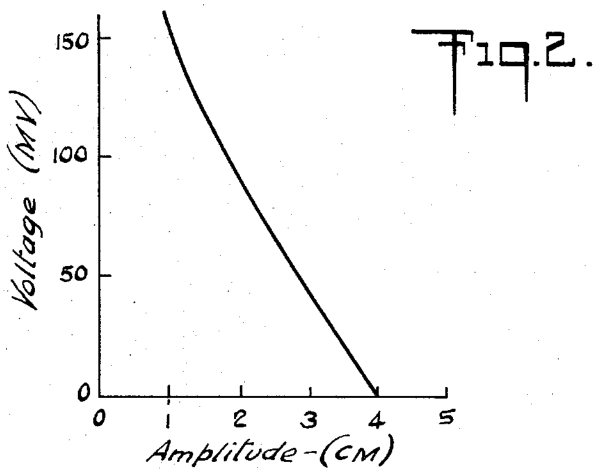
FIG. 2 is a calibration curve.

First, in order to retrieve accurate data, a calibration curve such as the one shown in FIG. 2 is plotted on graph paper from calibration steps nearest the desired data. This will be more fully understood by a momentary reference to FIG. 1 whereat there is illustrated a typical carrier-erase recording as it would appear if played back onto light sensitive paper. Assuming that there is provided an appropriate time interval between calibrations there will be only a slight change in the two sets of calibration steps shown in FIG. 1, assuming that the system allows for only gradual temperature changes. For example, if a magnetic recording system is employed which has a recording speed of 1 inch per minute on the magnetic tape, then the interval between calibration steps could be 30 minutes. For further example, to determine the amplitude of the record shown in FIG. 1 at point A, a curve such as that shown in FIG. 2 is plotted from the nearest calibration steps. The amplitude of point A is then transferred to the curve of FIG. 2 and the corresponding signal level is determined.

Figure 3:
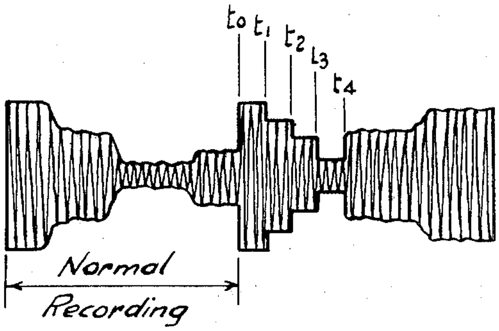
FIG. 3 is another portion of a carrier-erase recording, similar to that shown in FIG. 1, but further showing various calibration levels or amplitudes.
Figure 4:
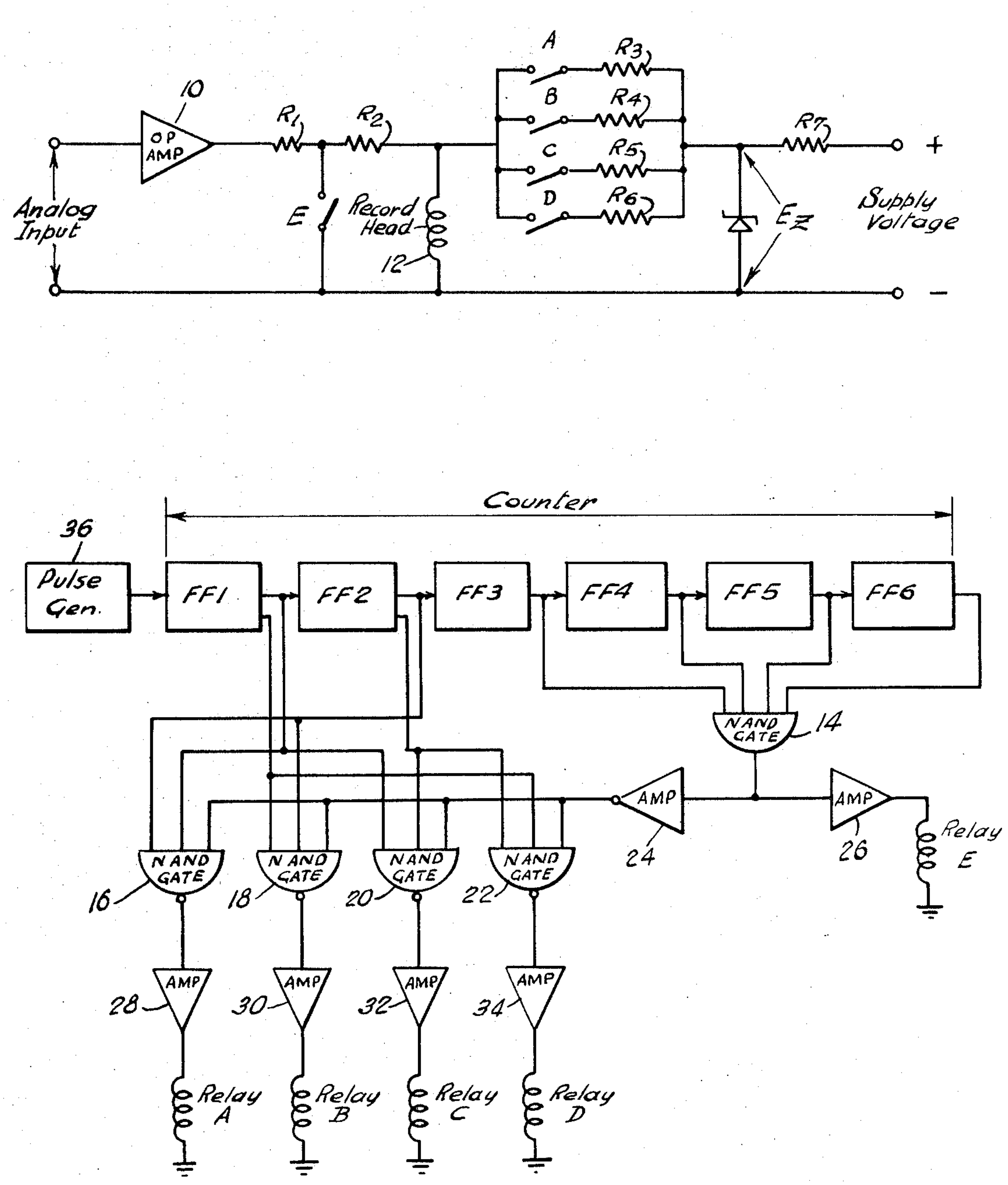
FIG. 4 is a schematic diagram showing the basic switching functions employed to provide the necessary calibration.

Operation of the calibration procedure which generates the periodic calibration levels or steps is best understood by examination of FIGS. 3 and 4, which show the basic switching functions employed. During normal recording of the analog signal all of the switch contacts A, B, C, D and E are opened. The D.C. analog input signal is amplified by a low drift operational amplifier 10, causing direct current to flow through the resistors R1 and R2 and through the recording head 12. This D.C. current erases the prerecorded carrier signal in proportion to the input analog signal. As indicated in FIG. 3 at time $t_0$, the switch E is closed by switch driving circuitry (shown in FIG. 5) and switch E remains closed for the duration of the calibration procedure. Switch E bypasses the current flow from an operational amplifier 10 around the recording head 12 during the calibration interval. Switch A also closes at time $t_0$ causing a constant current level (determined by the reference voltage $E_Z$ across a zener diode and a resistor R3) to flow through the recording head 12. Next, at time $t_1$ switch A opens and switch B closes applying the second calibration current to the recording head 12. Switches C and D perform in a similar manner at times $t_2$ and $t_3$, respectively. At time $t_4$ the switches D and E open terminating the calibration interval and allows normal recording to resume. The calibration interval (i.e., the interval from time $t_0$ to time $t_4$ may be made relatively short compared to the normal recording time (the time between calibrations) resulting in a minimum interruption of the normal recording cycle. The calibration currents are applied directly to the recording head 12 and not through the entire amplifier system. This is done so as to avoid readjusting calibration current levels each time the amplifier 10 experiences a sensitivity change.

It is to be understood that the drawings illustrate a single track or channel of recording. If more than a single channel is employed then separate additional calibration systems would be required. Operational amplifiers, such as 10, are chosen for low drift so as to make the analog output current independent of temperature changes.

The driving circuitry which operates the switches A through E, shown in FIG. 4 is shown separately in FIG. 5. As indicated, the driving circuitry is comprised of the six flip-flops identified as the flip-flops FF-1, FF-2, FF-3, FF-4, FF-5 and FF-6. In addition, the driving circuitry includes the NAND gates 14, 16, 18, 20 and 22. As indicated in FIG. 5, the NAND gate 14 drives the two amplifiers 24 and 26. Amplifier 26, in turn, drives the coil of relay E which controls switch E. The NAND gates 16 through 22, in turn, drive the amplifiers 28 through 34. Amplifier 28 drives relay A which controls switch A. Amplifier 30 drives the coil of relay B which controls switch B. Similarly, the amplifiers 32 and 34 drive the coils of relays C and D which, in turn, control switches C and D, respectively. The circuitry shown in FIG. 5 is essentially a conventional counter and decoder unit. The counter is driven by pulse generator 36 as shown.

Thus, there has been described hereinbefore a calibration system which has the unique feature of using periodic calibrations automatically placed on the magnetic tape which allows the use of this tape in recording accurate analog data at temperatures up to the physical limitation of the tape even though the normal sensitivity of the tape is changing.

While there has been illustrated in the drawings and described herein a more or less specific embodiment and method of practicing the invention, it is to be understood that this has been done for purposes of illustration only and that the scope of the invention is not to be limited thereby but is to be determined from the appended claims.

What is claimed is:

1. A system for recording an analog signal, comprising means for receiving said analog signal, means for providing direct current calibration signals, first switching means connected to the calibration signal means for sequentially passing the calibration signals in a predetermined order for a predetermined time interval, said first switching means includes a plurality of relays each relay having a coil and receiving a different calibration signal and being controlled by a control signal applied to its coil, so as to pass the calibration signal during the presence of the control signal and to block the calibration signal during the absence of a control signal, means for recording a signal on a magnetic medium, second switching means connected to the analog signal receiving means, to the first switching means and to recording means for passing a received analog signal to the recording means for a second predetermined time interval and for blocking the received analog signal during the first predetermined time interval while passing the calibration signals, passed by the first switching means, to the recording means; and means connected to the first and second switching means for controlling the first and second switching means, the control means includes means for providing timing pulses, a counter connected to the timing pulse means and counting the timing pulses, means connected to the counter and to the first and second switching means for decoding the count in the counter to provide a plurality of outputs as the control signals, one output occurring during the second predetermined time interval and is applied to the second switching means while the other outputs are provided as the control signals which occur at different times during the first time interval and applied to the different coils of the relays in the first switching means.

2. A system as described in claim 1 in which the first means includes a plurality of different valued resistors receiving a direct current voltage, a plurality of switching devices, each switching device being connected to the decoding means, to a different resistor and to the recording means and controlled by one of the outputs from the decoding means to pass a direct current voltage from the resistor to the recording means during a predetermined time period of the first predetermined time interval as a calibration signal.

* * * * *